March 24, 1970   L. L. ROUTH ET AL   3,503,032
ADAPTOR FOR ELECTRICAL POWER DISTRIBUTION TRACK
Filed Jan. 4, 1968   2 Sheets-Sheet 1
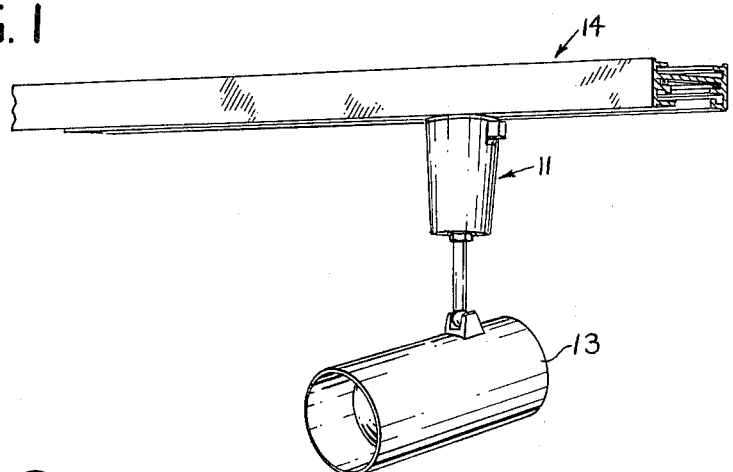
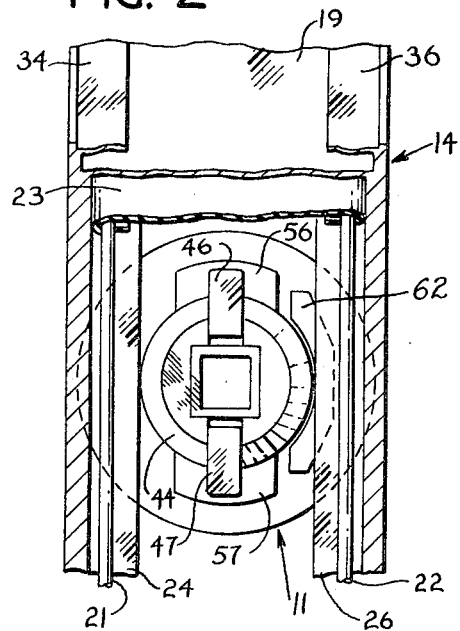
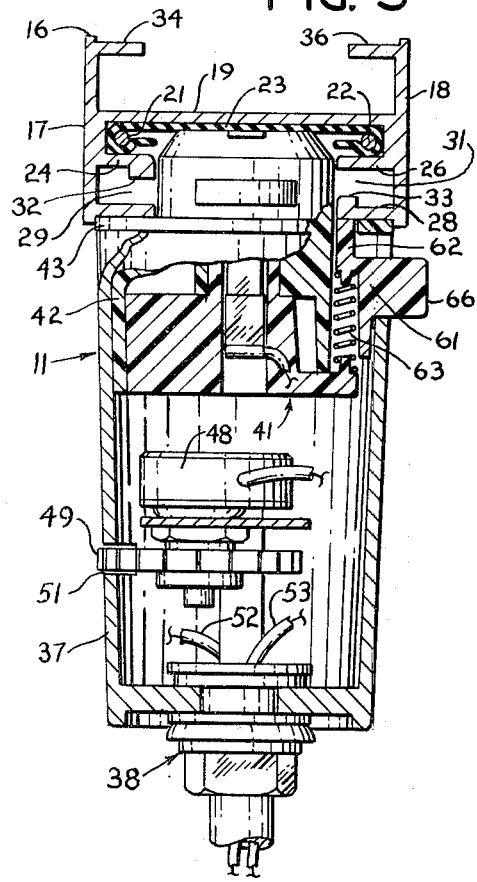
INVENTOR.
Larry L. Routh
BY James Contratto
Gardner + Zimmerman
Attorneys March 24, 1970  L. L. ROUTH ET AL  3,503,032

ADAPTOR FOR ELECTRICAL POWER DISTRIBUTION TRACK

Filed Jan. 4, 1968  2 Sheets-Sheet 2

INVENTOR.
Larry L. Routh
James Contratto
BY
Gardner & Zimmerman
Attorneys

# United States Patent Office 3,503,032
Patented Mar. 24, 1970

3,503,032
ADAPTOR FOR ELECTRICAL POWER
DISTRIBUTION TRACK
Larry L. Routh, Castro Valley, and James Contratto, Livermore, Calif., assignors to U.S. Industries, Inc., New York, N.Y., a corporation of Delaware
Filed Jan. 4, 1968, Ser. No. 695,597
Int. Cl. H01r 3/04, 9/12, 13/54
U.S. Cl. 339—14
15 Claims

ABSTRACT OF THE DISCLOSURE

An adaptor is described for electrically and mechanically securing an electrical fixture to an elongated electrical power distribution track which has an open mouthed channel running for its length. The adaptor has a cylindrical body which at one end is adapted for securance to the desired electrical fixture and at its opposite end has a connecting head for securing the adaptor to the track. The connecting head is provided with opposed, outwardly extending ears which are offset relative to one another longitudinally of the connecting head. Upon insertion of the connecting head within the channel and rotation of it through 90°, these ears engage within corresponding offset slots in the sides of the track channel to provide mechanical support of the adaptor by the track. The head also includes contact fingers which engage electrical conductors within the channel upon the 90° rotation of the adaptor, and a quick release locking mechanism provides securance of the adaptor to the track. A grounding contact mounted on the head grounds the adaptor to the track so that the effects of any electrical shorts are minimized.

BACKGROUND OF THE INVENTION

This invention relates to electrical power distribution and, more particularly, to an adaptor for securing an electrical fixture to an electrical power distribution track.

Electrical power distribution systems of the type which permit positioning of electrical fixtures such as lamps at various locations along a track have been designed in the past. These systems have the advantage that the location of the electrical fixtures can be changed as desired. They are especially advantageous with the use of lighting fixtures since there are many instances in which it is desirable that the placement of lights be changed. For example, the regular changing of exhibits in museums or galleries results in a continual changing of the lighting needs. Display windows, merchandise showrooms, restaurants, etc. can also make good use of power distribution systems of this type.

In spite of their advantages, this type of electrical distribution system has not received wide acceptance and usage. Past electrical distribution systems have been generally quite epensive and have not performed as well as they should. Moreover, the procedure for connecting the fixtures to the track of these prior systems has been complicated, and it has not been unusual for a short or the like to develop and cause shocks. With some of the available systems, no good means is provided for locking the fixtures securely in place on the track. The result is that often the fixtures inadvertently become loose. It should be obvious that if the system is being used for overhead lighting, unexpected dropping of the fixtures can cause injury to those beneath the system as well as to the fallen fixture.

SUMMARY OF THE INVENTION

The present invention is an adaptor for securely attaching an electrical fixture to the track of an electrical power distribution system. The adaptor can be connected to the track by a simple rotation of the hand. A simple manipulation is all that is needed to remove the adaptor and its associated fixture from the track even though they cannot inadvertently become loose from the track. Moreover, the adaptor is so constructed that a good contact is assured between the contacts of the adaptor and the conductors of the track, and means are provided for grounding the fixture to the track so that shorts in the fixture will not shock a user of the system.

In its basic aspects, the adaptor includes a main body which is adapted to have an electrical fixture secured at one end and, at the other end, has a connecting head for securing the adaptor to an electrical power distribution track. The track for which the adaptor is to be used is one which has an open mouth channel extending for its length and having disposed lengthwise within it at least two current carrying conductors in spaced apart and insulated relationship. The connecting head of the adaptor has at least two opposed, laterally outwardly extending electrical contact fingers which are insulated from one another. Upon insertion of the connecting head within the channel of the track and rotation of it 90°, these contact fingers engage respective ones of the current carrying conductors. The head also includes at least two outwardly extending supporting ears which when the adaptor is rotated as aforesaid engage within channels or slots at the sides of the track. These ears, as well as their corresponding slots in the track, are offset longitudinally of the head so that each ear is only insertable in a corresponding one of the slots to assure that the polarity of the electrical connection between the adaptor and the track is the same for each instance of connection of the adaptor to the track.

The adaptor also has a spring loaded projection which extends upwardly adjacent the connecting head. This projection is engaged by the track and depressed when a user inserts the connecting head into the track. Upon rotation of the adaptor to engage the adaptor electrical contact fingers and the ears with the track conductors and slots, respectively, this projection is moved to a position in alignment with the mouth of the channel. Its spring loading causes it to move upwardly into the channel mouth and engage the sides of the channel to block any further rotation in either direction of the adaptor. Thus, once the adaptor is connected to the track by such rotation, this projection prevents it from being removed should there tend to be any inadvertent rotation of the adaptor. To enable selective removal of the fixture, a tab is connected to the projection and extends outward through the side of the body. A user may simply move this tab downward in its slot to thereby retract the projection and permit the desired rotation of the adaptor for removal of the same.

A grounding contact is also provided on the connecting head in a location which will cause it to engage the track when the adaptor is locked to it. This assures that the track and the adaptor with any fixture attached to it are at the same ground contact so that shocks are avoided.

BRIEF DESCRIPTION OF THE DRAWINGS

With reference to the attached two sheets of drawings:

FIGURE 1 is an isometric view of a partial section of a power distribution track and an adaptor of the invention securing a lighting fixture thereto;

FIGURE 2 is a partial and broken away plan view of the track and adaptor of FIGURE 1 illustrating the adaptor rotatably orientated about its longitudinal axis relative to the track to permit insertion of the adaptor connecting head into the channel of the track;

FIGURE 3 is a cross-sectional view through the track and adaptor with them in the same relative orientation as that depicted in FIGURE 2;

DESCRIPTION OF THE PREFERRED EMBODIMENT

Figure 4:
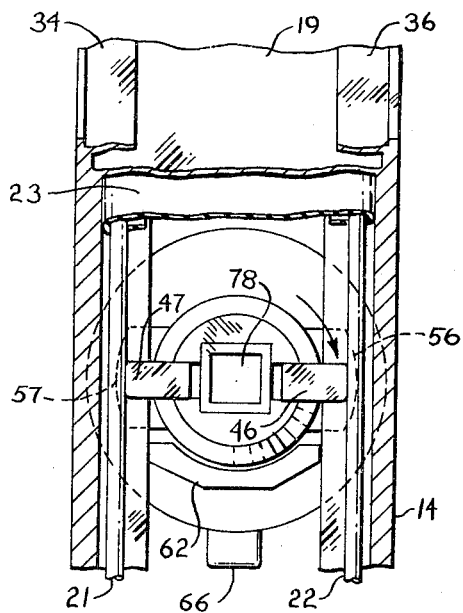
FIGURE 4 is another partial and broken away plan view of the track and adaptor illustrating the adaptor rotated to an electrical contacting and locking orientation relative to the track.

FIGURES 1 through 6 illustrate a preferred embodiment of the adaptor of the invention which is generally referred to by the reference numeral 11, and the manner in which it secures an electrical fixture such as the lamp 13 to a power distribution track 14.

As illustrated, track 14 is in the form of an elongated extruded rail 16 having side walls 17 and 18 which are connected together by a transversely extending partition wall 19. Partition wall 19 and the lower portions of rail side walls 17 and 18 define an open mouthed channel which extends lengthwise of the rail or, in other words, into the lower face of the track. As will be explained more fully hereinafter, this channel is adapted for the reception of a connecting head on the adaptor of the invention. Two current carrying conductors 21 and 22 are disposed within the channel and extend lengthwise thereof in spaced apart and insulated relationship so that electrical power can be provided along the length of the track. More particularly, conductors 21 and 22 are in the form of two parallel electrical wires disposed within an insulating sheath 23. Sheath 23 extends for the length of the track as does the wires, and is in the form of an elongated strip of insulating material having its longitudinal edges reentrantly curved and extending inward to provide at each edge a channel for one of the wires 21 and 22. The sheath and wire assembly is supported within the open mouthed channel against partition 19 by longitudinally extending continuous flanges 24 and 26 which extend transversely inwardly of side walls 17 and 18, respectively, intermediate partition 19 and the lower end of such walls. A second pair of flanges, longitudinally extending flanges 27 and 28 also extend transversely inwardly from side walls 17 and 18, respectively, adjacent the lower ends of such side walls. These latter flanges, together with flanges 24 and 26, define slots 29 and 31 which extend longitudinally of the inner sides of the channel. It will be noted that flange 24 has a downwardly projecting rib 32 which extends for its length and flange 28 on side wall 18 has an upwardly extending rib 33 which extends for its length. The provision of these ribs on these opposite flanges results in the slots 29 and 31 being vertically offset with respect to one another as shown. The purpose of this offset relationship will be explained in detail below in connection with the description of the manner by which the plug is secured to the track.

To permit securance of the track to a ceiling or the like, side walls 17 and 18 of rail 16 extend upwardly of partition 19 and have inwardly transversely extending flanges 34 and 36, respectively, at their upper ends. These flanges facilitate the connection of a suitable connector or clip to the track. Moreover, if desired, the channel provided by the upward extension of the side wall 17 and 18 can be used as a wireway or the like.

Figure 5:
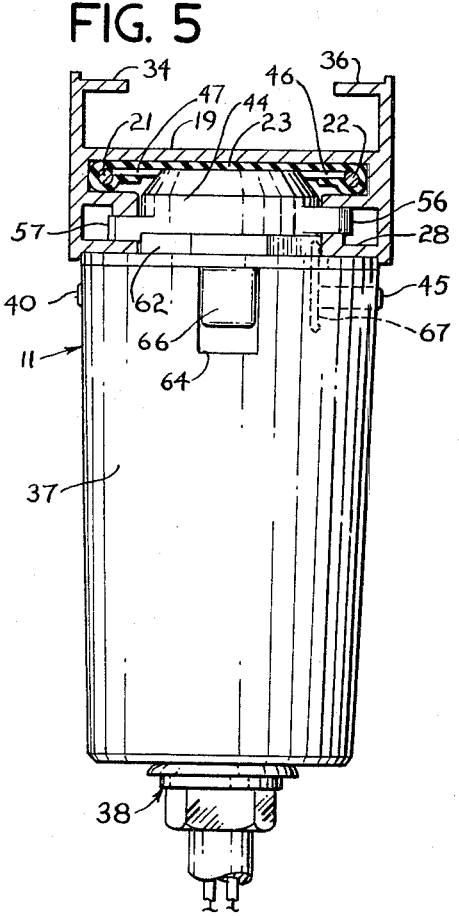
FIGURE 5 is a cross-sectional view of the track illustrating an adaptor electrically and mechanically secured thereto as depicted in FIGURE 4.

Turning now to the adaptor of the invention, it will be seen that the main body thereof is defined by a generally cylindrical and somewhat tapered metallic housing 37. Adaptor 11 is arranged adjacent the smaller diameter end of housing 37 for suitable securance to a desired electrical fixture such as lighting fixture 13. In the embodiment shown, this securance is obtained by means of a bushing and nut assembly 38. The other, or larger diameter end of the adaptor main body is provided with an end plug, generally referred to by the reference numeral 41, for closing the end of the casing and electrically and mechanically securing the adaptor to the track. Plug 41 includes a depending portion 42 which fits within the upper end of housing 11 and is suitably secured thereto such as by means of set screws 40 and 45 (FIGURE 5). An annular shoulder 43 on the plug engages the top edge of housing 11 to assure correct positioning of the depending portion 42 within the end of the housing.

The upper end of plug 41 is of reduced diameter to provide a nose or connecting head 44 adapted for insertion in the open mouthed channel of track 14. Head 41 is generally of insulating material and has a pair of electrical conductors extending longitudinally therethrough and terminating at the upper end of nose 44 into opposed, outwardly extending electrical contact fingers 46 and 47. These electrical fingers are adapted to contact conductors 21 and 22, respectively, of track 14 upon insertion of head 44 within the channel in the orientation shown in FIGURE 2, and rotation of the adaptor about its longitudinal axis through 90° to the orientation thereof shown in FIGURE 4. This will provide electrical contact between the adaptor and the track.

The lower end of the connecting head conductors are suitably secured to a variable resistance element in the form of a reostat 48. The resistance reostat 48 provides to the passage of current can be suitably controlled by a knurled actuating wheel 49 which extends through a transverse slot 51 in housing 11 to permit control of the resistance from the exterior of the adaptor. It is to be realized, of course, that reostat 48 will only be provided in those instances in which it is desired to be able to control over a continuous range the power delivered to the electrical fixture. When it is not desired to so control such power, reostat 48 can be replaced by a suitable on-off switch which is also actuatable exteriorly of adaptor 11 such as by means of an actuating wheel 49.

The output of reostat 48 is connected by means of leads 52 and 53 to the electrical fixture to be powered. It will be noted that to simplify the drawings for the sake of understanding, the leads from reostat 48 to the connecting head conductors and to the electrical fixture have been broken away.

To provide mechanical support of the adaptor within the track, the connecting head is provided with supporting members in the form of opposed, outwardly extending supporting ears 56 and 57. As shown, these ears are radially aligned with the contact fingers 46 and 47 and are downwardly spaced therefrom for engagement within the slots 29 and 31 upon rotation of the adaptor from the orientation shown in FIGURE 2 to the orientation shown in FIGURE 4.

As a particular salient feature of the instant invention, the supporting ears 56 and 57 are offset from one another longitudinally of the adaptor a distance which corresponds to the offset of the slots 29 and 31. Because of this offset relationship, the adaptor 11 can only be rotated in a direction to engage ear 57 within slot 29 and ear 56 within slot 31 to secure the adaptor to the track. This will assure that the adaptor is securable within the track only with contact 47 engaging conductor 21 and contact finger 46 engaging conductor 22. Thus, the correct polarity between the electrical fixture and the track 14 is assured.

As another especially salient feature of the present invention, means are provided for automatically locking the adaptor 11 to the track when it is in proper electrical contacting relationship therewith. More particularly, the adaptor includes a spring loaded plunger 61 which has a projection in the block 62 which is normally urged outward by a spring 63 through a slot in the end plug to a position adjacent the connecting head 44. As shown, plunger 61 is located circumferentially of the end plug at a position between ears 56 and 57. Upon insertion of head 44 within the open mouthed channel of track 14, projection 62 is engaged by either the flange 27 or, as here shown, the flange 28 depending on the manner in which the head is inserted, and is automatically depressed by the track. When adaptor 11 is then rotated 90° relative to the track to the orientation shown in FIGURE 4, projection 62 is urged outward by spring 63 to a position within the mouth of the channel. The sides of the projection will engage the ends of the flanges 27 and 28 to prevent any further rotation of the adaptor in either direction. In this connection it will be noted that the projection has a width which is substantially the same as the width of the mouth of the channel. With this arrangement, therefore, the adaptor will be locked in to position.

To enable rotation of the adaptor when it is desired to remove the same from the track, means are provided for selectively retracting the projection 62 against its spring loading. More particularly, housing 11 has a slot extending into its upper edge through which protrudes a tab 66 which is a part of plunger 61. A user by manipulating tab 66 downward with his thumb into the position depicted in FIGURE 6 will retract projection 62 from the mouth of the channel so that rotation of the adaptor 11 relative to the track is permitted for subsequent disconnection of the adaptor from the track.

It will be noted that while the above described means for locking the adaptor onto the track provides the lock automatically when the adaptor is rotated to secure the same to the track, it may simply be released by moving the thumb tab 66 downward. Because of this special but simple manipulation needed to release the lock, inadvertent unlocking of the adaptor from the track is obviated.

The adaptor of the invention also includes means for grounding the same relative to the track so that if a short should develop, the user of the adaptor will not be shocked upon touching the same. More particularly, a metallic grounding contact 67 is disposed within end plug 41 below and in radial alignment with support ear 56 (see FIGURE 5). Contact 67 extends upward from plug 41 to a position adjacent connecting head 44 so that when adaptor 11 is rotated to the orientation shown in FIGURES 4 and 5, it will engage and make electrical contact with the inner end of flange 28 of the track. If the track is of a metallic material having a coating, such as anodized aluminum, the upper exterior side edge of contact 67 can be provided with a sharpened edge which will scratch through the coating as the adaptor is rotated, to assure a good contact. Set screw 45 engages contact 67 to place it in electrical contact with the metallic housing 37 of the adaptor. If the electrical fixture secured to the adaptor has a metallic outer part, it can be placed in electrical contact with the adaptor by means of the nut and bushing assembly 38 at the reduced diameter end of the housing. Thus, any short in either the fixture or adaptor will be grounded through the track 14.

Figure 7:
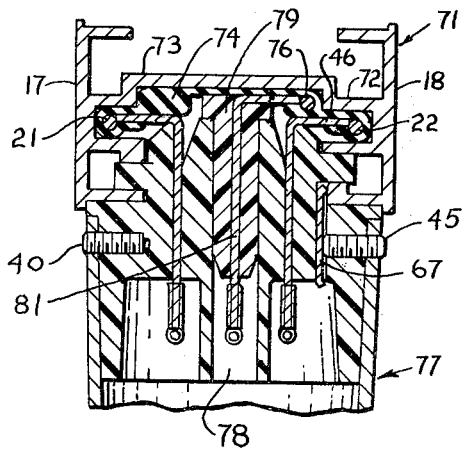
FIGURE 7 is a cross-sectional view of a track and a portion of an adaptor of a two-circuit embodiment of the invention.
Figure 6:
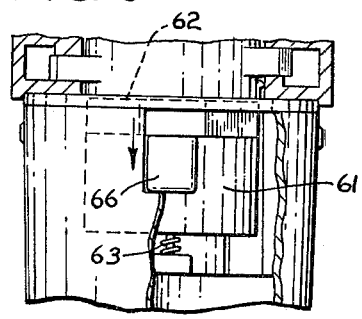
FIGURE 6 is a partial cross-sectional view of the track with a broken away portion of the adaptor secured therein but with the locking mechanism in an unlocking position to permit removal of the adaptor.

FIGURE 7 depicts an embodiment of the invention which enables the use of a fixture with a two circuit track. Both the adaptor and the track of this embodiment is identical to that previously described except for the changes noted below. Therefore, similar parts in this embodiment have been denoted by the same reference numerals used in referring to the other embodiment.

To facilitate the inclusion in the track 71 of this embodiment of a third conductor for the second circuit, the transverse partition 72 extending between the side walls 17 and 18 has an upwardly offset portion 73. The conductor insulating sheath 74 of this embodiment has a corresponding upwardly offset portion in which adjacent one edge is embedded a third conductor wire 76. Conductors 76 and 21 provide one 120 volt circuit, while the combination of conductors 21 and 22 provide an additional 120 volt circuit. Conductor 21 acts as a common neutral.

Adaptor 77 of this embodiment has extending into a rectangular shaped axial bore extending inwardly of its upper surface an insert 79 which encloses a third contact finger 81 having an outwardly extending portion radially aligned with the outwardly extending portion of finger 46 for contact with conductor 76. The three contact fingers are suitably secured by leads (not shown) through a double pole switch to the electrical fixture. The switch should desirably have an actuating mechanism such as the wheel 49 which is accessible from the exterior of the casing.

From the above it will be readily apparent that the adaptor of the invention permits connection through an electrical power track of an electrical fixture by a simple rotation of the hand. Because of the offset relationship of the supporting ears, the correct polarity between the adaptor and track is always assured. Moreover, the adaptor is automatically locked to the track when it is in its proper electrical contacting position and cannot be inadvertently loosened even though removal of the adaptor from the track is accomplished by a simple hand manipulation. Furthermore, electrical grounding to the track of the adaptor and any electrical fixture attached thereto is assured.

What is claimed is:

1. An adaptor for electrically and mechanically securing an electrical fixture to an electrical power distribution track which has an elongated open mouthed channel extending thereinto at one face and which has at least two current carrying conductors disposed within the channel and extending lengthwise thereof is spaced apart and insulated relationship, said adaptor comprising a main body having at one end a connecting head for connection of said adaptor to said track, said head in a first rotative orientation thereof to said channel being adapted for insertion into the mouth of said channel, and having at least two opposed laterally outwardly extending electrical contact fingers which are insulated from one another and each of which is adapted to engage one of the spaced current carrying conductors within said track upon insertion of said head within said channel in said first orientation and rotation of said adaptor about its longitudinal axis to a second orientation relative to said channel, supporting members on said head for mechanically securing said adaptor to said track when said adaptor is in said second orientation relative to said channel, and means for automatically locking the head of said adaptor within said channel in said second orientation, said means comprising a spring loaded projection on said adaptor normally resiliently urged to a position adjacent the portion of said head which is insertable within said channel, said projection being engaged and depressed by said track upon such insertion of said head into said channel, and being disengaged from said track and moving to a position projecting into the mouth of said channel upon rotation of said adaptor from said first orientation to said second orientation, said projection engageable with the sides of said channel when said adaptor is engaged within said channel in said second orientation to prevent rotation of said adaptor relative to said track, and means for selectively retracting against its spring loading said projection from the mouth of said channel to permit rotation of said adaptor from said second orientation to said first orientation and subsequent removal of said adaptor from said track.

2. The adaptor for electrically and mechanically securing an electrical fixture to a power distribution track according to claim 1 wherein said projection is a block which is normally resiliently urged outwardly of an aperture at the end of said body adjacent said head, and said means for selectively retracting said projection is a thumb tab secured to said block and which projects outwardly through the side of said adaptor body for engagement by the thumb of a user.

3. An adaptor for electrically and mechanically securing an electrical fixture to a power distribtuion track according to claim 1 wherein each longitudinal inner side of the channel of the track for which said adaptor is to be used has a slot extending longitudinally of the channel; and said supporting members on said head for mechanically securing said adaptor to said track are two opposed outwardly extending ears on said head which when said adaptor is in said first orientation relative to said channel are insertable in said channel with the remainder of said head and each of which upon rotation of said adaptor to said second orientation engages within the slots at a corresponding side of said channel.

4. The adaptor for electrically and mechanically securing an electrical fixture to a power distribution track according to claim 3 wherein the slot on one side of said channel of said track with which said adaptor is to be used is longitudinally off-set relative to the slot on the opposite side of the channel, and wherein said supporting ears are off-set from one another longitudinally of said adaptor a distance corresponding to the off-set of said slots whereby each of said ears is only insertable in its corresponding slot upon rotation of said adaptor from said first orientation to said second orientation to thereby assure that the polarity of electrical connection between said adaptor connecting fingers and said current carrying conductors within said channel is the same for each instance of connection of said adaptor to said track.

5. An adaptor for electrically and mechanically securing an electrical fixture to a power distribution track according to claim 4 wherein said track with which said adaptor is to be used is metallic, said adaptor has a metallic casing, and means are provided for grounding said metallic casing to said track, said means comprising a grounding contact at said connecting head adapted to engage with said track when said adaptor is in said second orientation relative to said channel and an electrical conductor leading from said grounding contact to said adaptor casing.

6. An adaptor for electrically and mechanically securing an electrical fixture to an electrical power distribution track which has an elongated open mouthed channel extending thereinto at one face and which has at least two current carrying conductors disposed within the channel and extending lengthwise thereof in spaced apart and insulated relationship, each longitudinal inner side of said channel having a slot extending longitudinally of the channel, the slot on one side of the channel being longitudinally off-set relative to the slot on the opposite side of the channel; said adaptor comprising a main body having at one end a connecting head for connection of said adaptor to said track, said head in a first rotative orientation thereof to said channel being adapted for insertion into the mouth of said channel and having at least two opposed laterally outwardly extending electrical contact fingers which are insulated from one another and each of which is adapted to engage one of the spaced current carrying conductors within said track upon insertion of said head within said channel and rotation of said adaptor about its longitudinal axis to a second orientation relative to said channel, said head having two opposed outwardly extending supporting ears which when said adaptor is in said first orientation relative to said channel are insertable in said channel with the remainder of said head and each of which upon rotation of said adaptor to said second orientation engages within the slot at a corresponding side of said channel, said supporting ears being off-set from one another longitudinally of said adaptor a distance corresponding to the off-set of said slots whereby each of said ears is only insertable in its corresponding slot upon rotation of said adaptor from said first orientation to said second orientation to thereby assure that the polarity of electrical connection between said adaptor connecting fingers and said current carrying conductors within said channel is the same for each instance of connection of said adaptor to said track.

7. The adaptor for electrically and mechanically securing an electrical fixture to a power distribution track according to claim 6 wherein said contact fingers and said supporting ears are radially aligned relative to the axis about which said adaptor rotates between said first and second orientations for simultaneous engagement of said contact fingers and said ears with said track conductors and slots, respectively.

8. The adaptor for electrically and mechanically securing an electrical fixture to a power distribution track according to claim 6 wherein said head includes a third laterally outwardly extending electrical contact finger which is longitudinally off-set and radially aligned with one of said two first fingers, said third contact fingers being adapted to engage a third current carrying conductor within said track upon insertion of said head within said channel and rotation of said adaptor about its longitudinal axis to said second orientation relative to said channel.

9. An adaptor for electrically and mechanically securing an electrical fixture to a power distribution track according to claim 6 wherein said track with which said adaptor is to be used is metallic, said adaptor has a metallic casing, and means are provided for grounding said metallic casing to said track, said means comprising a grounding contact at said connecting head adapted to engage with said track when said adaptor is in said second orientation relative to said channel, and an electrical conductor leading from said grounding contact to said adaptor casing.

10. An adaptor for electrically and mechanically securing an electrical fixture to a metal power distribution track which has an elongated open mouthed channel extending thereinto at one face and which has at least two current carrying conductors disposed within the channel and extending lengthwise thereof in spaced apart and insulated relationship, said adaptor comprising a main body having a metallic casing and at one end a connecting head for connection of said adaptor to said track, said head in a first rotative orientation thereof to said channel being adapted for insertion in said channel and having at least two opposed laterally extending electrical contact fingers which are insulated from one another and each of which is adapted to engage one of the spaced current carrying conductors within said track upon insertion of said head within said channel and rotation of said adaptor about its longitudinal axis to a second orientation relative to said channel, supporting members on said head for mechanically securing said adaptor to said track when said adaptor is in said second orientation relative to said channel and including a plurality of outwardly extending ears off-set from one another for selective insertion into slots provided therefor by said track within said channel to assure that the polarity of electrical connection between said adaptor connecting fingers and said current carrying conductors within said channel is the same for each instance of connection of said adaptor to said track, spring loaded projection structure carried by said adaptor for automatically locking the head of said adaptor within said channel in said second orientation, and means for grounding said metallic casing to said track, said means comprising a grounding contact at said connecting head adapted to engage with said track when said adaptor is in said second orientation relative to said channel and an electrical conductor leading from said grounding contact to said adaptor casing.

11. An adaptor for electrically and mechanically securing an electrical fixture to a metal power distribution track according to claim 10 wherein each longitudinal inner side of the channel of the track for which said adaptor is to be used has a slot extending longitudinally of the channel; and said supporting members on said head for mechanically securing said adaptor to said track are two opposed outwardly extending ears on said head which when said adaptor is in said first orientation relative to said channel are insertable in said channel with the remainder of said head and each of which upon rotation of said adaptor to said second orientation engages within the slot at a corresponding side of said channel, said grounding contact being longitudinally off-set and radially aligned with one of said ears for simultaneous engagement of said ears and said grounding contact with said slots and said track, respectively, upon rotation of said adaptor from said first orientation to said second orientation.

12. An adaptor for electrically and mechanically securing an electrical fixture to a power distribution track according to claim 10 wherein said adaptor includes means for automatically locking the head of said adaptor within said channel in said second orientation, said means comprising a spring loaded projection on said adaptor normally resiliently urged to a position adjacent the portion of said head which is insertable within said channel when said adaptor is in said first orientation relative to said track, said projection being engaged and depressed by said track upon said insertion of said head into said channel and being disengaged from said track and moving to a position projecting into the mouth of said channel upon rotation of said adaptor from said first orientation to said second orientation, said projection being engageable with the sides of said channel when said adaptor is engaged within said channel in said second orientation to prevent rotation of said adaptor relative to said track, and means for selectively retracting against its spring loading said projection from the mouth of said channel to permit rotation of said adaptor from said second orientation to said first orientation and subsequent removal of said adaptor from said track.

13. An adaptor for electrically and mechanically securing an electrical fixture to a power distribution track according to claim 11 wherein said head includes a third laterally outwardly extending electrical contact finger which is longitudinally off-set and radially aligned with one of said two first fingers, said third contact finger being adapted to engage a third current carrying conductor within said track upon insertion of said head within said channel and rotation of said adaptor about its longitudinal axis to said second orientation relative to said channel.

14. An adaptor for electrically and mechanically securing an electrical fixture to a metal power distribution track which has an elongated open mouthed channel extending thereinto at one face and which has at least two current carrying conductors disposed within the channel and extending lengthwise thereof in spaced apart and insulated relationship, said adaptor comprising a main body having a metallic casing and at one end a connecting head for connection of said adaptor to said track, said head in a first rotative orientation thereof to said channel being adapted for insertion in said channel and having at least two opposed laterally extending electrical contact fingers which are insulated from one another and each of which is adapted to engage one of the spaced current carrying conductors within said track upon insertion of said head within said channel and rotation of said adaptor about its longitudinal axis to a second orientation relative to said channel, supporting members on said head for mechanically securing said adaptor to said track when said adaptor is in said second orientation relative to said channel, and means for grounding said metallic casing to said track, said means comprising a grounding contact at said connecting head adapted to engage with said track when said adaptor is in said second orientation relative to said channel and an electrical conductor leading from said grounding contact to said adaptor casing, each longitudinal inner side of the channel of the track for which said adaptor is to be used having a slot extending longitudinally of the channel, and said supporting members on said head for mechanically securing said adaptor to said track being two opposed outwardly extending ears on said head which when said adaptor is in said first orientation relative to said channel are insertable in said channel with the remainder of said head and each of which upon rotation of said adaptor to said second orientation engages within the slot at a corresponding side of said channel, said grounding contact being longitudinally off-set and radially aligned with one of said ears for simultaneous engagement of said ears and said grounding contact with said slots and said track, respectively, upon rotation of said adaptor from said first orientation to said second orientation.

15. An adaptor for electrically and mechanically securing an electrical fixture to a metal power distribution track which has an elongated open mouthed channel extending thereinto at one face and which has at least two current carrying conductors disposed within the channel and extending lengthwise thereof in spaced apart and insulated relationship, said adaptor comprising a main body having a metallic casing and at one end a connecting head for connection of said adaptor to said track, said head in a first rotative orientation thereof to said channel being adapted for insertion in said channel and having at least two opposed laterally extending electrical contact fingers which are insulated from one another and each of which is adapted to engage one of the spaced current carrying conductors within said track upon insertion of said head within said channel and rotation of said adaptor about its longitudinal axis to a second orientation relative to said channel, supporting members on said head for mechanically securing said adaptor to said track when said adaptor is in said second orientation relative to said channel, and means for grounding said metallic casing to said track, said means comprising a grounding contact at said connecting head adapted to engage with said track when said adaptor is in said second orientation relative to said channel and an electrical conductor leading from said grounding contact to said adaptor casing, said adaptor including means for automatically locking the head of said adaptor within said channel in said second orientation, said means comprising a spring loaded projection on said adaptor normally resiliently urged to a position adjacent the portion of said head which is insertable within said channel when said adaptor is in said first orientation relative to said track, said projection being engaged and depressed by said track upon said insertion of said head into said channel and being disengaged from said track and moving to a position projecting into the mouth of said channel upon rotation of said adaptor from said first orientation to said second orientation, said projection being engageable with the sides of said channel when said adaptor is engaged within said channel in said second orientation to prevent rotation of said adaptor relative to said track, and means for selectively retracting against its spring loading said projection from the mouth of said channel to permit rotation of said adaptor from said second orientation to said first orientation and subsequent removal of said adaptor from said track.

References Cited

UNITED STATES PATENTS

| 2,977,566 | 3/1961 | Neumann et al. | 339—119 |
| 3,154,646 | 10/1964 | Jurca et al. | |
| 3,246,074 | 4/1966 | Neumann et al. | |
| 3,295,093 | 12/1966 | Newmann et al. | 339—21 |

MARVIN A. CHAMPION, Primary Examiner

PATRICK A. CLIFFORD, Assistant Examiner

U.S. Cl. X.R.

191—23; 339—21